US005622421A

United States Patent [19]
Turley, Jr. et al.

[11] Patent Number: 5,622,421
[45] Date of Patent: Apr. 22, 1997

[54] VEHICLE HEADLAMP ASSEMBLY WITH CALIBRATION RESTRICTOR

[75] Inventors: Richard E. Turley, Jr., Anderson; David R. Mc Mahan, Noblesville, both of Ind.; William W. Froehner, Troy, Mich.

[73] Assignee: General Motors Corporation, Detroit, Mich.

[21] Appl. No.: 578,315

[22] Filed: Dec. 26, 1995

[51] Int. Cl.⁶ ........................................ B60Q 1/04
[52] U.S. Cl. ........................ 362/66; 362/289; 362/428
[58] Field of Search ............................ 362/66, 69, 271, 362/273, 287, 289, 418, 422, 428, 429

[56] References Cited

U.S. PATENT DOCUMENTS

| | | | |
|---|---|---|---|
| 4,689,725 | 8/1987 | Saijo et al. | 362/66 |
| 4,916,587 | 4/1990 | Hirose et al. | 362/66 |
| 5,023,759 | 6/1991 | Eckenrode | 362/66 |
| 5,063,480 | 11/1991 | McMahan et al. | 362/61 |
| 5,065,293 | 11/1991 | Mochizuki | 362/273 |
| 5,067,056 | 11/1991 | Suzuki et al. | 362/66 |
| 5,068,769 | 11/1991 | Umeda et al. | 362/61 |
| 5,077,642 | 12/1991 | Lisak | 362/66 |
| 5,091,829 | 2/1992 | Hendrischk et al. | 362/61 |
| 5,138,533 | 8/1992 | Daumueller | 362/66 |
| 5,138,542 | 8/1992 | Daumueller et al. | 362/420 |
| 5,140,503 | 8/1992 | Lisak | 362/61 |
| 5,150,958 | 9/1992 | Miyazawa et al. | 362/66 |
| 5,186,531 | 2/1993 | Ryder et al. | 362/66 |
| 5,186,532 | 2/1993 | Ryder et al. | 362/66 |
| 5,193,905 | 3/1993 | Edwards et al. | 362/425 |
| 5,197,794 | 3/1993 | Scott et al. | 362/66 |
| 5,197,799 | 3/1993 | Dehaene | 362/420 |
| 5,343,372 | 8/1994 | Shirai et al. | 362/66 |
| 5,351,170 | 9/1994 | Nagengast et al. | 362/66 |
| 5,365,415 | 11/1994 | Schmitt et al. | 362/66 |
| 5,388,036 | 2/1995 | Stoppelkamp | 362/66 |
| 5,446,630 | 8/1995 | Chikada et al. | 362/66 |
| 5,446,632 | 8/1995 | Childs et al. | 362/69 |
| 5,497,300 | 3/1996 | Haug | 362/66 |

*Primary Examiner*—Ira B. Lazarus
*Assistant Examiner*—Thomas M. Sember
*Attorney, Agent, or Firm*—Ernest E. Helms

[57] ABSTRACT

A headlamp aim adjuster is provided including a housing generally secured to a fixed portion of a vehicle and an aim pointer fixed to the housing. The headlamp aim adjuster further has a driven rod mounted by the housing and extendable therefrom to set a distance between the fixed portion of the vehicle and a lamp unit, a drive shaft rotatably mounted to the housing wherein rotation of the drive shaft determines the extension of the rod from the housing, and a position indicator being spring biased to a first position for adjustable movement relative to the housing. The position indicator has a zero ("0") marking so that upon establishing the desired aim position of the lamp unit by rotating the drive shaft, the position indicator is located with the zero ("0") marking in line with the aim pointer. The headlamp aim adjuster further includes a restrictor for retaining the position indicator in a second position to prevent movement of the position indicator zero ("0") marking from the aim pointer when the lamp unit is initially being adjusted.

4 Claims, 4 Drawing Sheets

VEHICLE HEADLAMP ASSEMBLY WITH CALIBRATION RESTRICTOR

FIELD OF THE INVENTION

This invention concerns headlamps in general and, more particularly, relates to a vehicle headlamp having an adjustment device for providing fore and aft adjustable movement of one end of the headlamp and that includes indicia and a pointer indicator which can be repositioned relative to the indicia to indicate the correct aimed position of the headlamp and afterwards can be recalibrated if the need should arise and additionally have a calibration restrictor for initial adjustment.

BACKGROUND OF THE INVENTION

Headlamps with aerodynamic styling provide for replaceable halogen bulbs. This permits the lens and reflector to remain in place on the vehicle and only requires that the smaller halogen bulb be replaced, should a bulb burn out and require servicing. These headlamps are aimed with a "Hopkins" or "Hoppy" aimer that registers on three aim "tips" that are molded onto the front surface of each headlamp lens. The Hopkins aiming device is separate from the headlamp and attaches with a suction cup to the three aim "tips" on the headlamp lens surface. These three tips establish a plane that permits the headlamp to be aimed mechanically, without the headlamp bulb being lighted.

The Hopkins aimer has contained with it a level bubble (a curved sealed glass vial filled with mineral spirits and an air bubble) that is used to aim the headlamp vertically. Other Hopkins aimer features permit horizontal aiming. The Hopkins aimer is set up so that its internal level bubble is parallel to the axis of the high beam parabola and also parallel to the light emitted from the headlamp. As the headlamp is adjusted with the vertical adjustment assembly, the level bubble in the Hopkins aimer moves until it is in a position that shows that the lamp is in aim (in the middle of the spirit bubble vial).

There are three recent changes in headlamps that have affected the three aim tips used for the Hopkins aimer. Recent changes in headlamp size have reduced the vertical size of the lens surface to the extent that in some cases there is no room for aim tips or special adapters for Hopkins aimers. For these headlamps, a new aiming device is required. Secondly, the use of "reflector optics" with a clear lens has created a lens without aim tips. Styling has dictated that the lens be clear so that the fluted reflector surfaces (reflector optics) can be seen. These headlamps also require a new aiming device. Thirdly, headlamps can have an independent adjustable reflector within an external housing and lens. This is referred to as an internally adjustable reflector headlamp. This headlamp generally has reflector optics and a clear lens and also requires a new aiming device.

For these new categories of headlamps, the Federal government has required that there be some means of establishing the vertical and horizontal aim of a headlamp after vehicle assembly. Level bubbles are generally used for vertical aiming. Special vehicle headlamp aiming devices (VHAD) are used for horizontal aiming. This invention covers one of these VHADs attached to a horizontal adjusting device.

The general concept that is followed is to aim the headlamp optically at the vehicle assembly plant and to use a VHAD to establish a mark or some other calibration indicating method to show where the "in-aim" position is for the headlamp (horizontal aim). In that way, should the headlamp horizontal aim change due to vehicle vibration during driving or any other reason, the headlamp could be re-aimed by bringing the headlamp back to the "marked" or "in-aim" position (shown by the VHAD) that was established previously at the vehicle assembly plant. The indicating method must also allow tier recalibration in case aim is changed relative to the vehicle body as could happen in an accident or if aim calibration is lost.

SUMMARY OF THE INVENTION

The VHAD described in the present invention enables one to horizontally aim the lighted headlamp on the vehicle assembly line using photo cells and then, after aiming, to move an indicator on the headlamp itself to show an "in-aim" position. In other words, after headlamp aiming, one can calibrate the VHAD to show the proper aim position of the headlamp with this device. This is user friendly in design and easily used "in the field." This indicator shows the owner of the vehicle and/or the service technicians at the dealership or garage where to adjust the headlamps for proper aim, should they have become mis-aimed. Additionally, the present invention has a removable retainer so that a vehicle assembly plant does not spend time recalibrating VHADs after headlamp aiming.

DESCRIPTION OF THE PREFERRED EMBODIMENT

Figure 1:
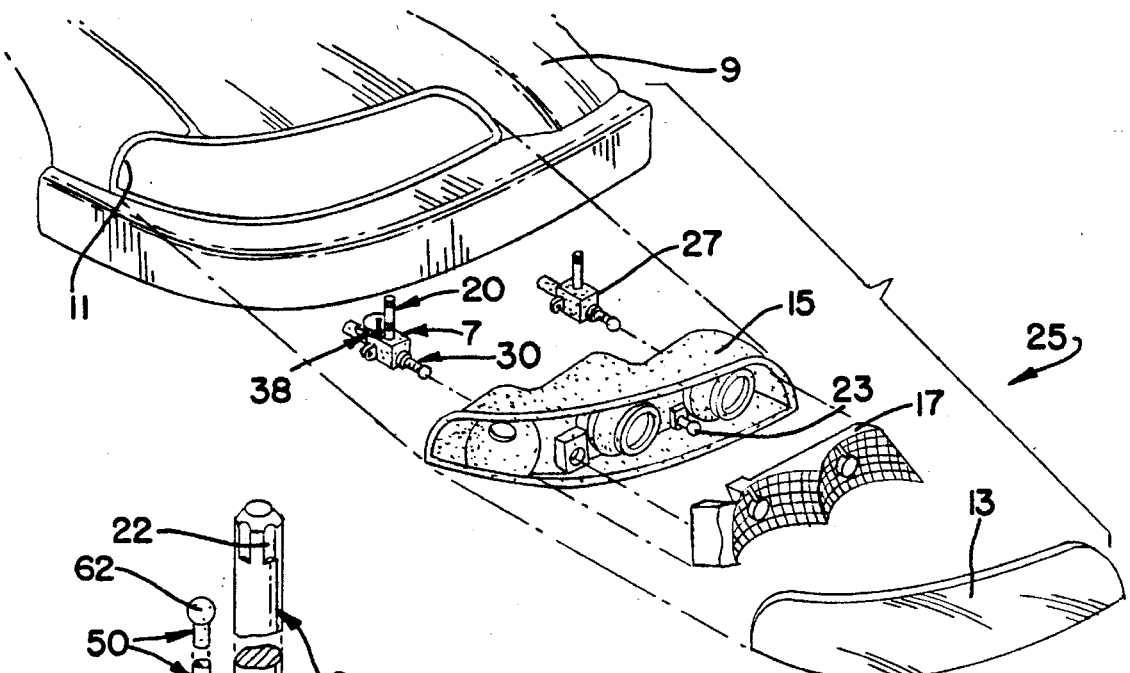
FIG. 1 is a perspective view of a preferred embodiment adjustment device according to the present invention shown exploded away from its operational environment in an automotive vehicle.
Figure 2:
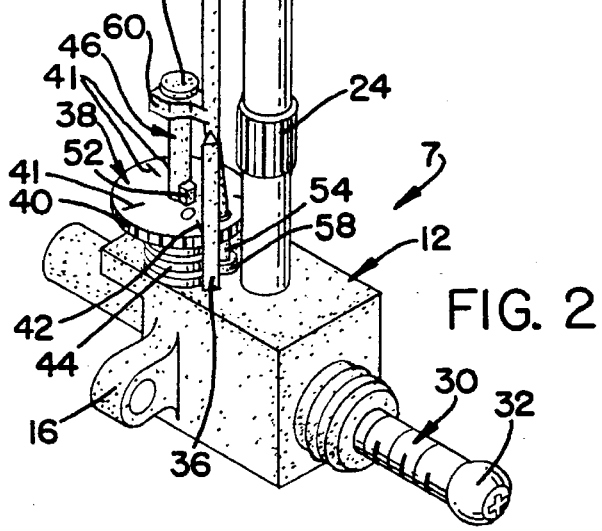
FIG. 2 is an enlarged perspective view of the adjuster device shown in FIG. 1.
Figure 3:
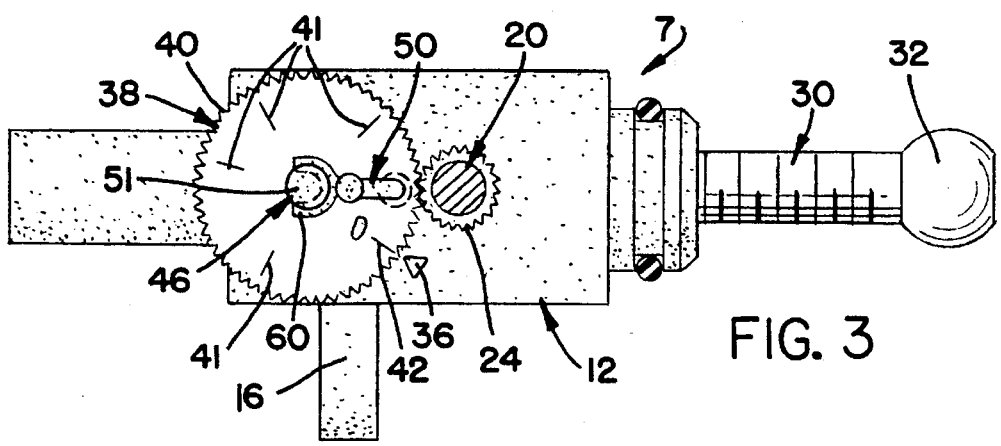
FIG. 3 is a top plan view of the adjuster device shown in FIG. 2.

Referring to FIGS. 1–5, an automotive vehicle body 9 and associated headlamp system 25 has an opening 11 which is covered by a lens 13. Fixed within the opening 11 is a headlamp assembly bracket 15. Fixably connected to the bracket is a headlamp adjuster 7. The headlamp adjuster 7 has a body 12 with side ears 14 and 16 for acceptance of a suitable fastener to attach the adjuster 7 to the vehicle via the bracket 15. The bracket 15 supports a movable reflector housing 17 in a three-point extended fashion. In the embodiment shown in FIG. 1, a lens 13 is connected to the vehicle body 9 rather than to the reflector housing 17. An adjustment of the headlamps is effectuated by an adjustment in position of the reflector housing 17 alone. In other embodiments (not shown), the reflector housing 17 and lens 13 move as a unitary unit.

The three-point support of the reflector housing 17 by the housing 15 allows for adjustment in two planes. A fixed point of support is provided by a rod 23 with a fixed ball. Another point of support for the vertical adjustment is provided by an adjuster unit 27 which can be similar or identical to the adjuster 7. Horizontal adjustment is provided by the adjuster 7 which, as mentioned previously, is fixably connected to the bracket 15.

Adjuster 7 has a driver member 20 with a head 22 to allow for easy connection with a wrench or other adjustment device. The driver member 20 also around its periphery has an upper gear 24 and at its lower end is fixably connected to a lower gear 26. The adjustment device 7 also has a housing 12 which rotatably mounts a driven member drive screw 30 having a balled end 32. The drive screw 30 is threadably encircled by a gear 34 which is driven by gear 26 to selectively extend or retract the drive screw 30. Fixably connected to the housing is an aim pointer 36.

An indicator disk 38 has along its peripheral edge gear teeth 40 for meshing engagement with the gear teeth 24. The position indicator disk 38 also has a marking 42 to indicate the zero position and markings 41 for other degrees of right/left aim position.

Positioned underneath the indicator disk 38 is a coil spring 44. The disk is rotatably mounted on a rod 46 which extends upward from the housing 12. The rod 46 has a head 51 and a noncircular guide portion 52.

Figure 4:
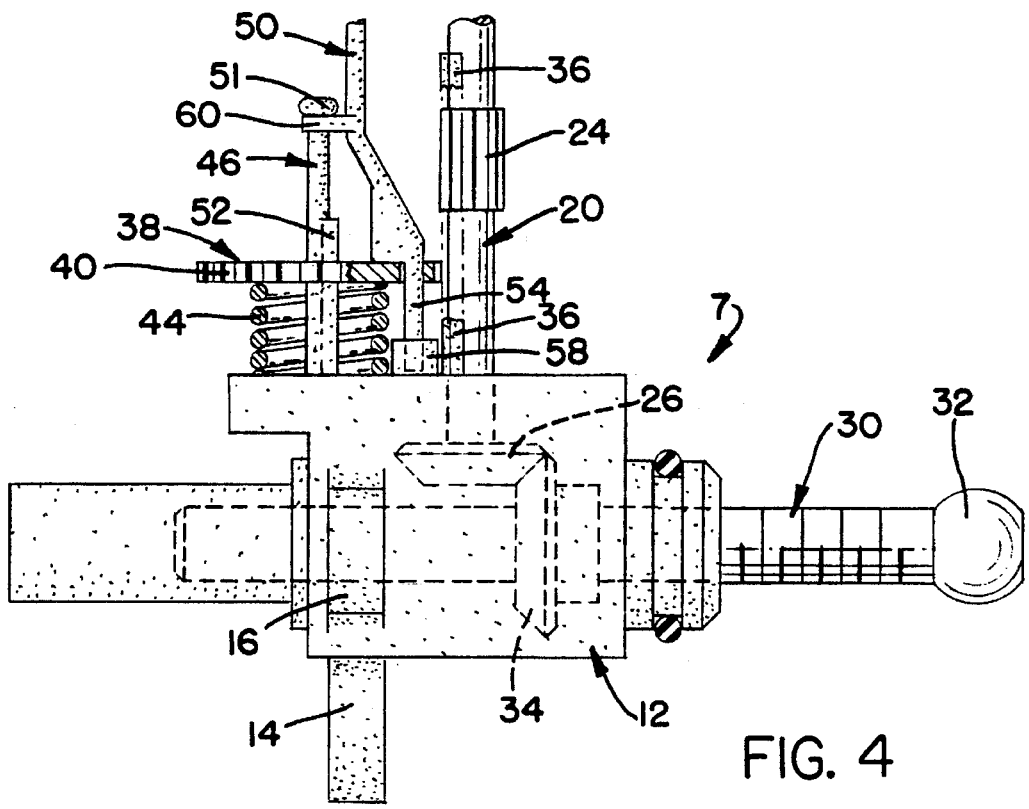
FIG. 4 is a side elevational view of the adjuster device shown in FIG. 2.
Figure 5:
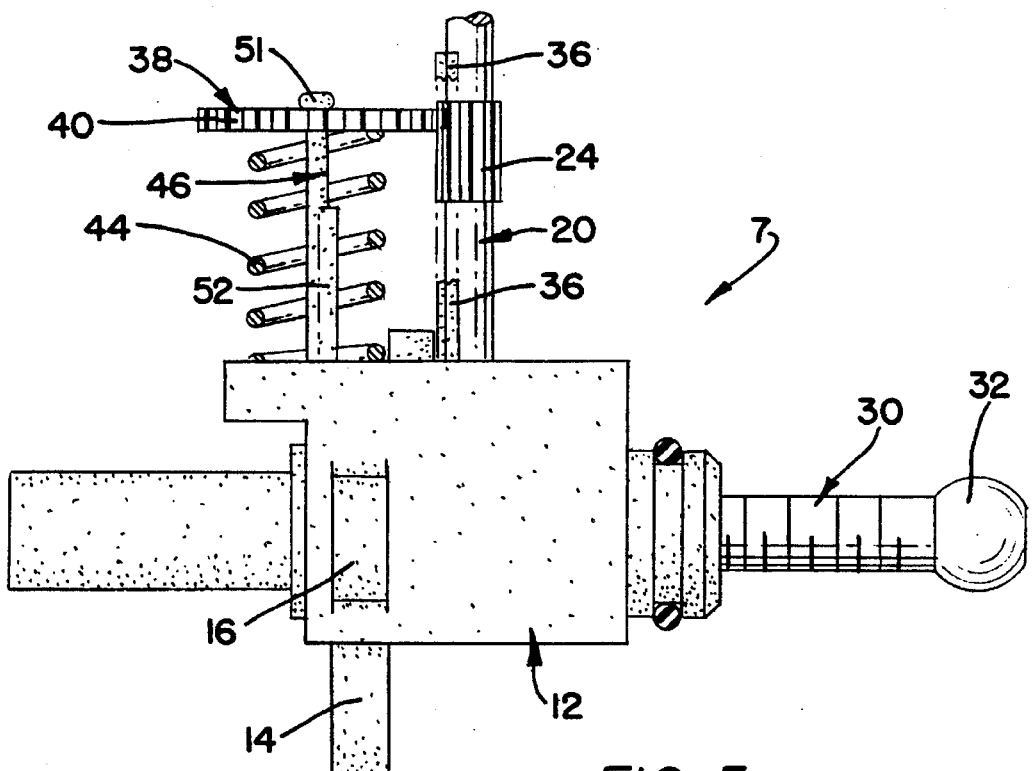
FIG. 5 is a view similar to that of FIG. 4 demonstrating operation of the adjuster device.
Figure 6:
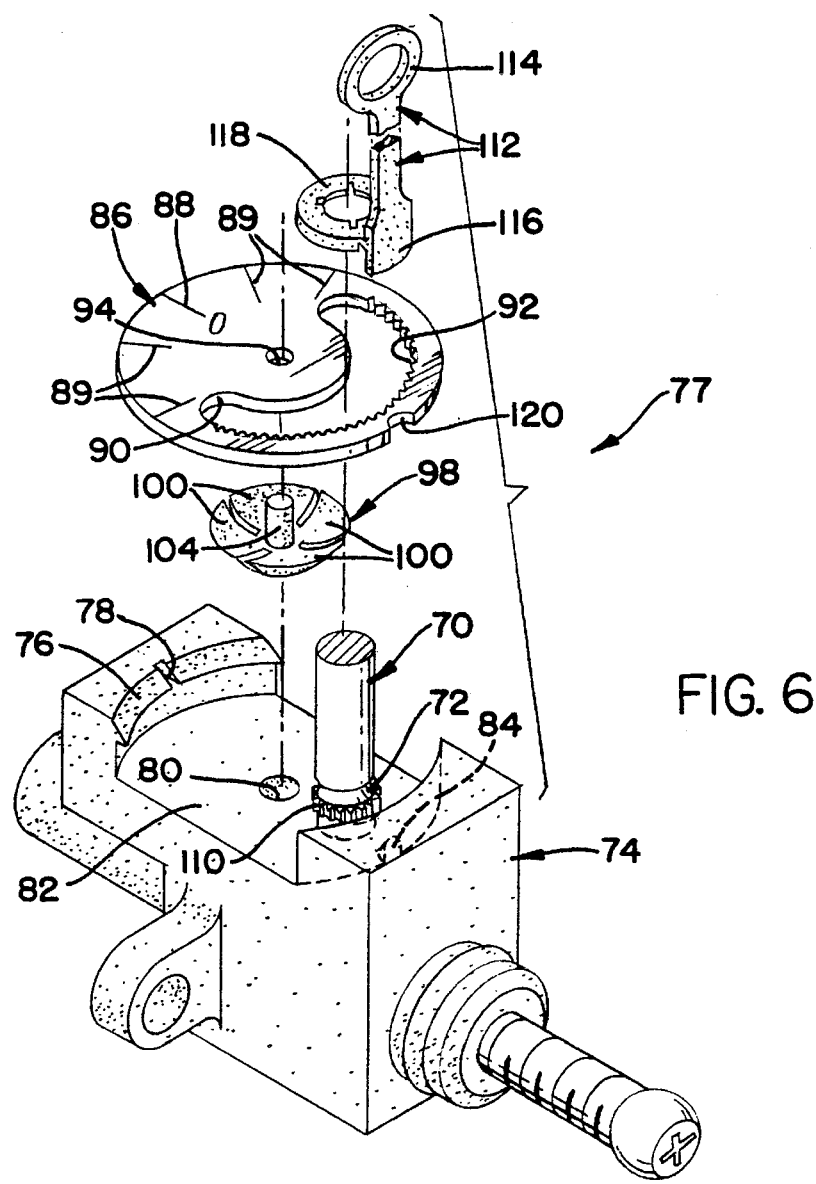
FIG. 6 is an exploded perspective view of an alternate preferred embodiment of an adjuster device according to the present invention.
Figure 7:
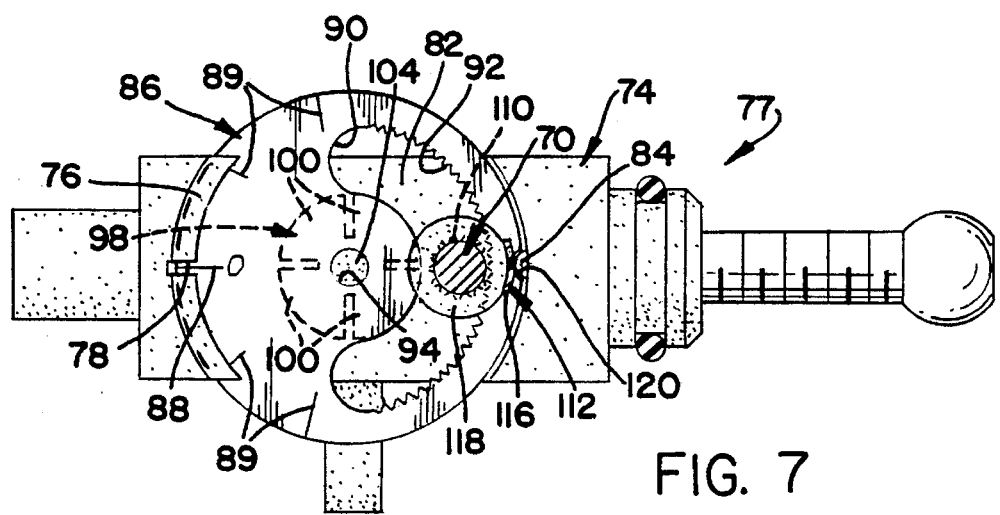
FIG. 7 is a top plan view of the adjuster device shown in FIG. 6.

When the vehicle headlamp or reflector body is being adjusted at the factory, the indicator disk 38 will be in the position shown in FIG. 4 being held down by a restrictor clip 50. Restrictor clip 50 has a bottom leg 54 for wedging receipt within a receptacle 58 of the housing 12. Additionally, the restrictor clip 50 has a clip arm 60 which holds on to the rod 46 underneath the head 51. The headlamp unit 25 is manually or automatically aimed with the restrictor clip 50 in place as shown in FIG. 4 holding the indicator disk 38 in a position such that its indicator marking 42 at "0" is in alignment with the pointer 36 of the housing. After adjustment is complete, the assembler can grab the clip 50 by a tip 62, allowing the clip 50 to be pulled away. Thereafter, as shown in FIG. 5, the spring 44 will push the disk 38 up the guide portion 52 to its engaged position with the gear 24 of the drive shaft 20. Thereafter, any adjustment of the position of the reflector body 17 will be indicated by the indicator disk 38 relative to the aim pointer 36. After repair or other service operations, the vehicle operator may aim the headlamp unit 25 by turning the drive shaft 20 until the zero indicator marking 42 is realigned with the aim pointer 36 as initially set in the factory.

Figure 8:
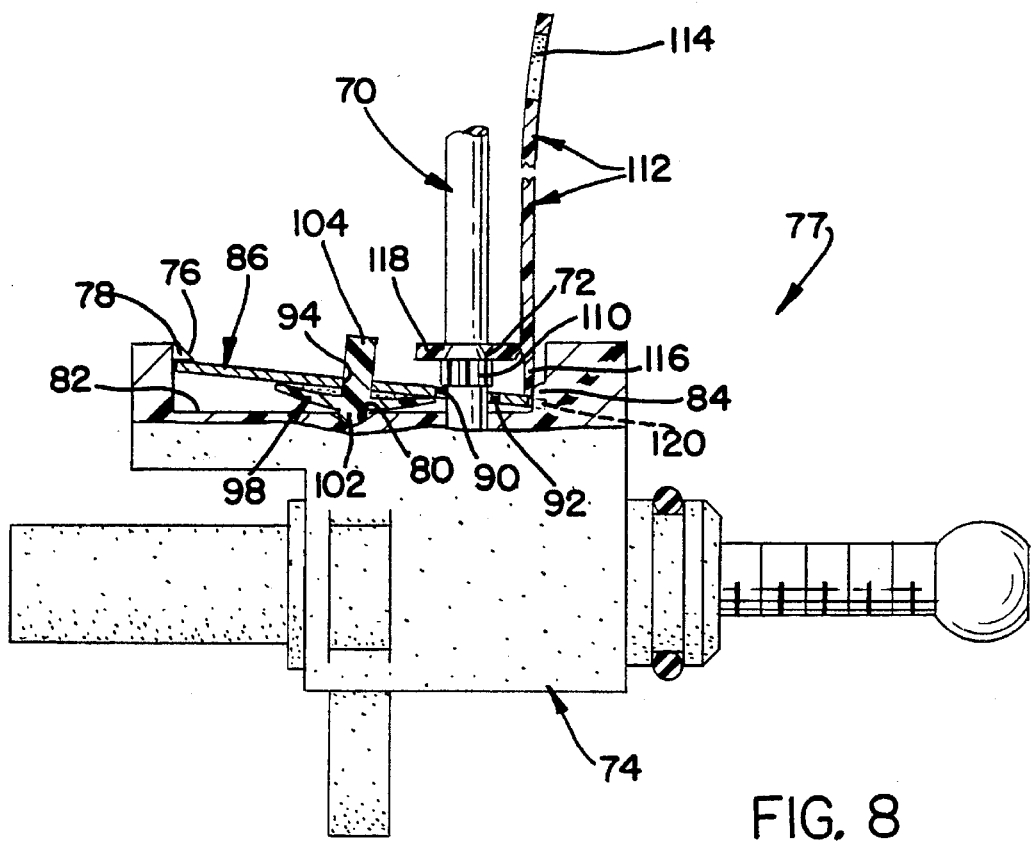
FIGS. 8 and 9 are side elevational views demonstrating operation of the adjuster device shown in FIG. 6.
Figure 9:
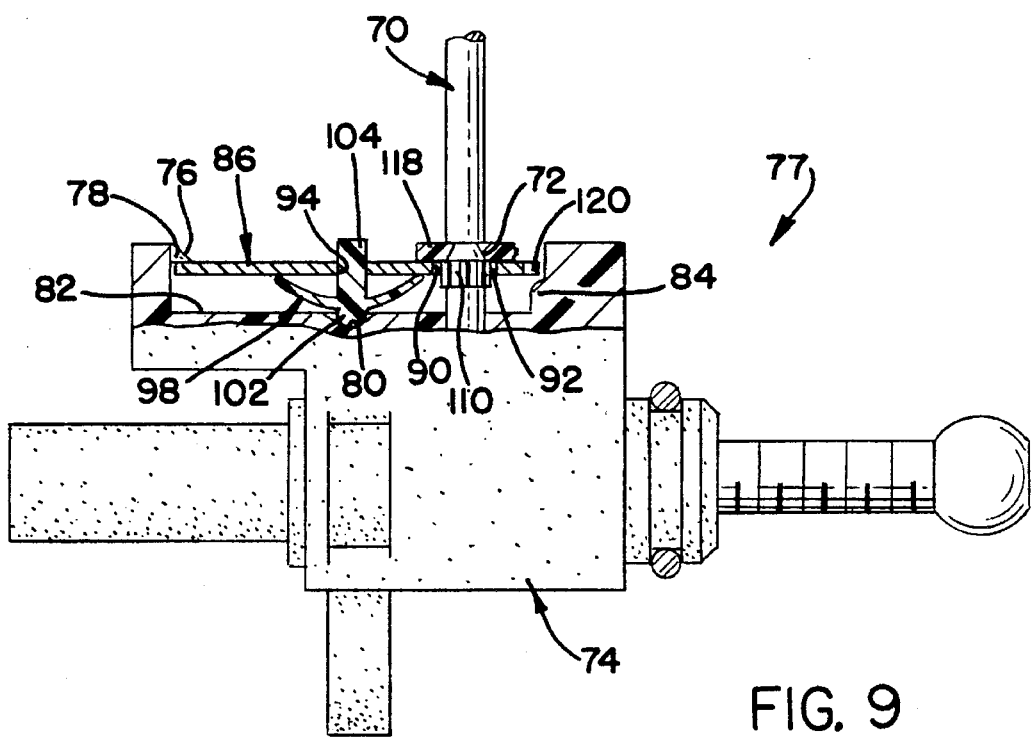

Referring to FIGS. 6 through 9, an alternate preferred embodiment 77 of the present invention has an almost identical drive shaft 70, except for having a chamber 72. The adjuster 77 also has a body 74 with a semi-angular ledge 76 having an aim pointer 78. The body 74 also has a central indention 80 and a surface 82 with a foot 84. An indicator disk 86 has a zero marking 88, left/right angled markings 89 and a semicircular interior slot 90 with gear teeth 92. The indicator disk 86 also has a central bore 94. The indicator disk 86, as best shown in FIGS. 8 and 9, is spring biased upward by a leaf spring 98, which has spring leaves 100, a circular head 102 and a stem 104. The stem 104 fits through the bore 94 of the indicator disk, and the head 102 fits within indention 80. Retaining the indicator disk 86 in a position of nonmeshing engagement with a drive shaft gear 110 is a restrictor 112. Restrictor 112 would typically be made of a plastic material having a pull tab 114, an annular tear-away ring 116 and a detent leg 118 which in the position shown in FIG. 8 maintains the indicator disk 86 out of engagement with the gear teeth 110. The foot 84, by insertion into a notch 120 of the disk, retains the disk 86 in the nonadjustable position when held down by the retainer foot 116. After adjustment of the lamp unit has been effectuated, the pull tab 114 will be pulled, causing a severing of the disk 116, thereby allowing the indicator disk 86 to be pushed upward to the position shown in FIG. 9.

While this invention has been described in terms of preferred embodiments thereof, it will be appreciated that other forms could readily be adapted by one skilled in the art. Accordingly, the scope of this invention is to be considered limited only by the following claims.

What is claimed is:

1. In combination with a headlamp assembly having a lamp unit mounted on a fixed portion of a vehicle and supporting a light source, a first adjustment device and a second adjustment device located between the fixed portion of the vehicle and the lamp unit for adjusting the lamp unit in a vertical plane and in a horizontal plane, respectively, for aiming a light beam emitted by the light source, one of the adjustment devices comprising:

a housing generally secured to a fixed portion of the vehicle, the housing having an aim pointer;

a driven member mounted by the housing and extendable therefrom to set a distance between the fixed portion of the vehicle and the lamp unit;

a driver member rotatably mounted to the housing wherein rotation of the drive member determines the extension of the driven member from the housing;

a position indicator being spring biased to a first position for adjustable movement relative to the housing, and the position indicator having a zero ("0") marking therewith so that upon establishing the desired aim position of the lamp unit by rotating the driver member, the position indicator is located with the zero ("0") marking in line with the aim pointer; and a restrictor retaining the position indicator in a second position to prevent movement of the position indicator zero ("0") marking from the aim pointer when the lamp unit is initially being adjusted.

2. An adjustment device as described in claim 1 wherein the position indicator is a disk with gear teeth to mesh with gear teeth provided on the driver member when the position indicator is in the first position.

3. An adjustment device as described in claim 2 wherein the disk has teeth on its peripheral edge.

4. An adjustment device as described in claim 2 wherein the disk has an internal slot which encompasses the driver member and wherein the internal slot has the gear teeth of the disk.

* * * * *